A. A. BLOMFELDT.
AIR CONDITIONING APPARATUS.
APPLICATION FILED FEB. 20, 1913.
1,113,950.
Patented Oct. 20, 1914.
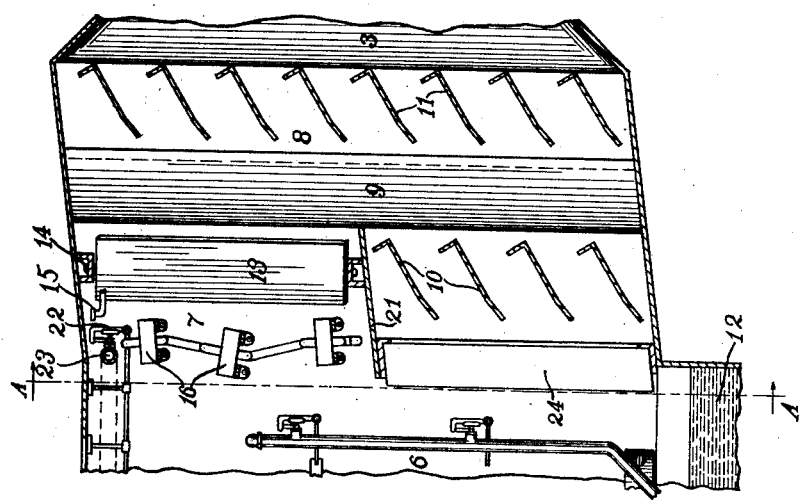
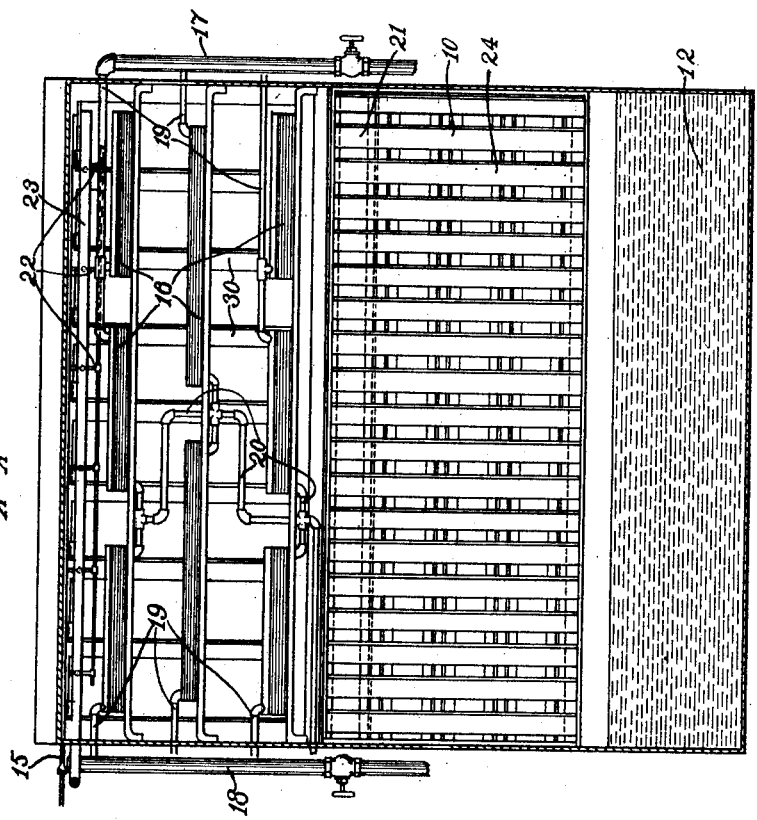

UNITED STATES PATENT OFFICE.

ALLEN A. BLOMFELDT, OF CHICAGO, ILLINOIS.

AIR-CONDITIONING APPARATUS.

1,113,950.  Specification of Letters Patent.  Patented Oct. 20, 1914.

Application filed February 20, 1913. Serial No. 749,657.

*To all whom it may concern:*

Be it known that I, ALLEN A. BLOMFELDT, a citizen of the United States of America, and a resident of Chicago, county of Cook, and State of Illinois, have invented certain new and useful Improvements in Air-Conditioning Apparatus, of which the following is a specification.

The main object of this invention is to provide an improved form of air conditioning apparatus, having improved means for humidifying the air as it is caused to pass through the apparatus.

An illustrative embodiment of this invention is shown in the accompanying drawings in which—

Figure 1 is a transverse section taken on the line A—A of Fig. 2. Fig. 2 is a longitudinal sectional elevation of the apparatus somewhat enlarged.

In the construction shown in the drawings, a casing 1, preferably of rectangular cross section, is provided with an inlet opening (not shown) and an outlet opening 3, through which air is caused to pass by means of the blower (not shown). Within the casing is arranged spraying mechanism 6, humidifying means 7, and an eliminator 8. The air in passing through the apparatus is first washed free of impurities by the spraying mechanism 6, which may be of any suitable construction. After being washed, the air is saturated with the proper amount of moisture by the humidifying means 7, and then has the excess of moisture carried in suspension removed therefrom by means of the vertical baffle walls 9 and the upwardly inclined baffle walls 10 and 11 of the eliminator 8. The casing is mounted on a tank 12, arranged below the spraying mechanism, and is adapted to supply water therefor.

The humidifying chamber and means 7 are located in the upper part of the casing 1 between the spraying mechanism and the vertical baffle plates 9. The passage of air through the chamber is controlled by means of the vertical dampers 13. The dampers 13 are mounted to swing on trunnions 14 and are connected to a rod 15 by means of which they are simultaneously operated. A plurality of heating coils or radiators 16 are arranged in the compartment. The coils are preferably of substantially oblong cross section and are suitably connected to a source of steam supply herein shown as headers 17 and 18 arranged at the sides of the casing 1. The coils are connected to said headers by means of pipes 19 and are connected by pipes 20 to a return header (not shown). The several horizontal series of coils are staggered in vertical relation and are inclined in respectively opposite directions so that water falls in a transverse sheet from one to another of the coils, and onto the partition 21 from whence it falls in a sheet into the tank 12. There is advantage in the oblong form of coil in that it provides a wide top surface over which the water flows for facilitating evaporation. A plurality of water distributers 22 are connected to a supply pipe 23 located above the uppermost coils 16 which discharge water onto said coils. Below the partition 21 are arranged a series of vertical plates 24 disposed at an angle, which cause the water in leaving the partition 21 to travel down the surfaces thereof, thus aiding in humidifying the air that passes directly into the eliminators.

The operation of the device shown is as follows: The inlet of the apparatus is suitably connected to the atmosphere from whence air is drawn through the apparatus by means of the blower. The air is first caused to pass through the water issuing from the spraying mechanism 6 by which it is washed free of dust and gases. A part of the air current is caused to pass through the humidifying chamber 7, whereas the other part passes directly into the eliminator 8. In passing through the humidifying chamber the air comes in contact and must pass through the sheets of heated water dropping from the steam coils 16 and falling from one to another. Water is evaporated by the steam coils, and the air is warmed by its contact therewith, so that the air becomes saturated with moisture. That part of the current of air passing below the humidifying chamber is to a certain extent also warmed and humidified by reason of its contact with the water running down the plates 24. As the air passes through the eliminator 8, any moisture that is held in suspension is removed from the air so that upon entering the fan it is practically at the point of complete saturation. The volume of air passing through the humidifying chamber 7 is controlled by the dampers 13, which may be shifted so as to increase or decrease the space between them and thereby control the division of the air column passing through the casing 1.

Although but one specific embodiment of this invention has been herein shown and described, it will be understood that numerous details of the construction shown may be altered or omitted without departing from the spirit of this invention as defined by the following claims.

I claim—

1. Air conditioning apparatus, comprising a casing, means adapted to cause air to flow through said casing, a plurality of heating coils of substantially oblong cross-section located in said casing one above the other across the path of the air, and a water supply located above the uppermost of said coils and adapted to discharge a sheet of water onto said uppermost coil, said coils being arranged so that the water will fall in a sheet from one of said coils adjacent to one of its edges and strike the next coil below adjacent to one of its edges and then fall in a sheet from said next coil adjacent to the opposite edge thereof.

2. Air conditioning apparatus, comprising a casing, means adapted to cause air to flow through said casing, a plurality of heating coils of substantially oblong cross-section arranged in said casing one above the other with their long dimensions transverse to the flow of air, said coils being offset with respect to each other and having their upper faces inclined, and a water supply located above the uppermost of said coils and adapted to discharge a sheet of water onto said uppermost coil adjacent to one of its edges, said water traveling along the inclined surface of said coil and being discharged in a sheet therefrom and falling onto the next coil, traveling along the upper surface of said next coil and falling in a sheet from the edge thereof.

3. Air conditioning apparatus, comprising a casing, means adapted to cause air to flow through said casing, a plurality of heating coils of substantially oblong cross-section arranged in said casing one above the other in staggered relation with their long dimensions transverse to the flow of air with alternate coils having their upper faces inclined in respectively opposite directions, and a water supply located above the uppermost of said coils and adapted to discharge a sheet of water onto said uppermost coil adjacent to one of its edges, said water traveling along the inclined surface of said coil and being discharged in a sheet therefrom and falling onto the next coil, traveling along the upper surface of said next coil and falling in a sheet from the edge thereof.

Signed at Chicago this 17th day of February 1913.

ALLEN A. BLOMFELDT.

Witnesses:
 EUGENE A. RUMMLER,
 JENNIE BURT.

---

Copies of this patent may be obtained for five cents each, by addressing the "Commissioner of Patents, Washington, D. C."